(12) United States Patent
Sahouani et al.

(10) Patent No.: US 7,981,469 B2
(45) Date of Patent: Jul. 19, 2011

(54) ENCAPSULATED CHROMONIC PARTICLES

(75) Inventors: Hassan Sahouani, Hastings, MN (US); Sanat Mohanty, Minneapolis, MN (US); Cristin E. Moran, Woodbury, MN (US)

(73) Assignee: 3M Innovative Properites Company, Saint Paul, MN (US)

( * ) Notice: Subject to any disclaimer, the term of this patent is extended or adjusted under 35 U.S.C. 154(b) by 0 days.

(21) Appl. No.: 12/895,013

(22) Filed: Sep. 30, 2010

(65) Prior Publication Data

US 2011/0020540 A1  Jan. 27, 2011

Related U.S. Application Data

(62) Division of application No. 11/275,364, filed on Dec. 28, 2005, now Pat. No. 7,824,732.

(51) Int. Cl.
*B01J 13/02* (2006.01)
(52) U.S. Cl. .................. 427/213.3; 427/213.31
(58) Field of Classification Search ............ 427/213.3
See application file for complete search history.

(56) References Cited

U.S. PATENT DOCUMENTS

| | | | |
|---|---|---|---|
| 4,882,166 A | 11/1989 | Graham et al. |
| 5,215,757 A | 6/1993 | El-Nokaly |
| 5,948,487 A | 9/1999 | Sahouani et al. |
| 6,051,290 A | 4/2000 | Sahouani et al. |
| 6,214,499 B1 | 4/2001 | Helber et al. |
| 6,245,399 B1 | 6/2001 | Sahouani et al. |
| 6,248,364 B1 | 6/2001 | Sengupta et al. |
| 6,355,386 B1 | 3/2002 | Helber et al. |
| 6,375,968 B1 | 4/2002 | Quong |
| 6,395,354 B1 | 5/2002 | Sahouani et al. |
| 6,411,354 B1 | 6/2002 | Lavrentovich et al. |
| 6,488,866 B1 | 12/2002 | Sahouani et al. |
| 6,524,665 B2 | 2/2003 | Sahouani et al. |
| 6,527,977 B2 | 3/2003 | Helber et al. |
| 6,538,714 B1 | 3/2003 | Sahouani et al. |
| 6,562,363 B1 | 5/2003 | Mantelle et al. |
| 6,570,632 B2 | 5/2003 | Lavrentovich et al. |
| 6,574,044 B1 | 6/2003 | Sahouani et al. |
| 6,576,712 B2 | 6/2003 | Feldstein et al. |
| 6,645,444 B2 | 11/2003 | Goldstein |
| 6,645,578 B2 | 11/2003 | Sahouani et al. |
| 6,673,398 B2 | 1/2004 | Schneider et al. |
| 6,696,077 B2 | 2/2004 | Scherr |
| 6,696,113 B2 | 2/2004 | Kawata et al. |
| 6,699,533 B2 | 3/2004 | Sahouani et al. |
| 6,777,036 B2 | 8/2004 | Bravo Vasquez et al. |
| 6,962,734 B2 | 11/2005 | Nazarov et al. |
| 7,026,019 B2 | 4/2006 | Dutova et al. |
| 7,247,723 B2 | 7/2007 | Sahouani et al. |
| 7,582,330 B2 | 9/2009 | Sahouani et al. |
| 7,601,769 B2 * | 10/2009 | Mohanty et al. ............ 523/206 |
| 7,629,027 B2 * | 12/2009 | Moran et al. .................. 427/256 |
| 7,687,115 B2 | 3/2010 | Sahouani et al. |
| 7,718,716 B2 | 5/2010 | Mohanty et al. |
| 7,824,732 B2 | 11/2010 | Sahouani et al. |
| 2004/0197416 A1 | 10/2004 | Simonnet et al. |
| 2006/0110540 A1 | 5/2006 | Sahouani et al. |
| 2007/0128291 A1 | 6/2007 | Tokie et al. |
| 2007/0134301 A1 | 6/2007 | Ylitalo et al. |
| 2007/0140957 A1 | 6/2007 | Mohanty et al. |
| 2008/0063714 A1 | 3/2008 | Sahouani et al. |

FOREIGN PATENT DOCUMENTS

| | | |
|---|---|---|
| EP | 1 232 414 B1 | 8/2002 |
| KR | 10-2003-0010846 | 2/2003 |
| WO | WO98/37997 A2 | 9/1998 |
| WO | WO00/22463 A1 | 4/2000 |
| WO | WO2004/033488 A2 | 4/2004 |
| WO | WO2005/011629 A1 | 2/2005 |
| WO | WO2005/012488 A2 | 2/2005 |

OTHER PUBLICATIONS

Aguirre, et al., "CTAB Mediated Reshaping of Metallodielectric Nanoparticles", Nano Letters, (2003), pp. 1707-1711, vol. 3, No. 12, American Chemical Society.

Attwood et al., "Lyotropic Mesophase Formation by Anti-Asthmatic Drugs", Mol. Cryst. Liq. Cryst., (1984), pp. 349-357, vol. 108, Gordon and Breach, Science Publishers, Inc.

Barbic et al., "Single Crystal Silver Nanowires Prepared by the Metal Amplification Method", Journal of Applied Physics, (Jun. 1, 2002), pp. 9341-9345, vol. 91, No. 11, 2002 American Institute of Physics.

Brinker et al., "Review of Sol-Gel Thin Film Formation", Journal of Non-Crystalline Solids, (1992), pp. 424-436, vol. 147 & 148, Elsevier Science Publishers B. V.

Ding et al., "Structure Analysis of Nanowires and Nanobelts by Transmission Electron Microscopy", J. Phys. Chem. B, (2004), pp. 12280-12291, vol. 108, No. 33.

Fang et al., "Aggregation and Surface-Enhanced Raman Activity Study of Dye-Coated Mixed Silver-Gold Colloids", *Journal of Raman Spectroscopy*, (2004), pp. 914-920, vol. 35, No. 11, John Wiley & Sons, Ltd.

Hong et al., "Ultrathin Single-Crystalline Silver Nanowire Arrays Formed in an Ambient Solution Phase", Science, (Oct. 12, 2001), pp. 348-351, vol. 294.

(Continued)

*Primary Examiner* — Dah-Wei D Yuan
*Assistant Examiner* — Andrew Bowman
(74) *Attorney, Agent, or Firm* — Gregory D. Allen

(57) ABSTRACT

A method of making encapsulated chromonic nanoparticles includes exposing crosslinked chromonic nanoparticles to an acid selected from the group consisting of carbonic acid, phosphoric acid, lactic acid, citric acid, boric acid, sulfuric acid, and mixtures thereof in the presence of water to encapsulate the crosslinked nanoparticles in a shell comprising a complex comprising the chromonic material, the multivalent cations, and the acid anions.

20 Claims, No Drawings

OTHER PUBLICATIONS

Huang et al., "Nanowire Arrays Electrodeposited from Liquid Crystalline Phases", Advanced Materials, (Jan. 4, 2002), pp. 61-64, vol. 14, No. 1, Wile-VCH Verlag GmbH, D-69469 Weinheim.

Hurley, L. H. et al., "G-quadruplexes as Targets for Drug Design", Pharmacol Ther., (Mar. 2000), vol. 83, No. 3, pp. 141-158.

Kawasaki et al., "Controlled Layering of Two-Dimensional J-Aggregate of Anionic Cyanine Dye on Self-Assembled Cysteamine Monolayer on Au(111)", Langmuir, (2000), pp. 5409-5417, vol. 16, No. 12, American Chemical Society.

Kostko, A. F. et al., "Salt Effects on the Phase Behavior, Structure, and Rheology of Chromonic Liquid Crystals", J. Phys. Chem., (Oct. 20, 2005), vol. 109, No. 41, pp. 19126-19133.

Kumar et al., "Linear Superclusters of Colloidal Gold Particles by Electrostatic Assembly on DNA Templates", Advanced Materials, (Mar. 2, 2001), pp. 341-344, vol. 13, No. 5, Wiley-VCH Verlag GmbH, D-69469 Weinheim.

Lydon, "Chapter XVIII Chromonics", Handbook of Liquid Crystals, Low Molecular Weight Liquid Crystals II, (1998), pp. 981-1007, vol. 2 B, Wiley-VCH Verlag GmbH, D-60469, Weinheim.

Lydon, "Chromonic Mesophases", Current Opinion in Colloid and Interface Science, (2004), pp. 480-490, vol. 8, Elsevier Ltd.

Medintz et al., "Self-Assembled Nanoscale Biosensors Based on Quantum Dot FRET Donors", Nature Materials, (Sep. 2003), pp. 630-638, vol. 2, Nature Publishing Group.

Pardavi-Horvath et al., "Iron-Alumina Nanocomposites Prepared by Ball Milling", IEEE Transactions on Magnetics, (Sep. 1992), pp. 3186-3188, vol. 28, No. 5.

Roques et al., Encapsulation of insulin for oral administration preserves interaction of the hormone with its receptor invitro, Apr. 1992, Diabetes, 41(4):451-456 (abstract only), http://diabetes.diabetesjournals.org/content/41/4/451.abstract.

Stenzel et al., "The Incorporation of Metal Clusters Into Thin Organic Dye Layers as a Method for Producing Strongly Absorbing Composite Layers: An Oscillator Model Approach to Resonant Metal Cluster Absorption", Journal of Physics D: Applied Physics, (1995), pp. 2154-2162, vol. 28, No. 10, IOP Publishing, Ltd.

Zhang et al., "Polymer Microgels: Reactors for Semiconductor, Metal, and Magnetic Nanoparticles", JACS, (2004), 7908-7914, vol. 126, No. 25, American Chemical Society.

* cited by examiner

ENCAPSULATED CHROMONIC PARTICLES

CROSS REFERENCE TO RELATED APPLICATIONS

This application is a divisional of U.S. Ser. No. 11/275,364, filed Dec. 28, 2005 now U.S. Pat. No. 7,824,732, now allowed, the disclosure of which is incorporated by reference in its entirety herein.

FIELD

This invention relates to encapsulated chromonic particles that are useful, for example, for controlled release and, in another aspect, to methods for making the encapsulated chromonic particles.

BACKGROUND

Encapsulation and controlled release of a substance or material may be achieved by a number of methods. Typically, a polymeric coating may be used to either surround a substance or to form a mixture with a substance. Another common approach uses macroscopic structures having openings or membranes that allow for release of a substance. Encapsulation and controlled release finds broad utility, but is particularly useful in the field of controlled release drug delivery.

PCT Publication WO 2005/012488 describes encapsulating a guest molecule (for example, a drug) in a chromonic matrix so that it can be subsequently released. The chromonic matrix can protect a drug from certain environmental conditions and then controllably deliver the drug under other environmental conditions.

SUMMARY

Briefly, the present invention provides a method of making an encapsulated chromonic nanoparticle. The method comprises (a) preparing an aqueous mixture comprising (i) a continuous water-soluble polymer phase and (ii) a discontinuous chromonic phase comprising a chromonic material, to form chromonic nanoparticles; (b) non-covalently crosslinking the resulting chromonic nanoparticles with a multivalent cation salt; and (c) exposing the resulting crosslinked chromonic nanoparticles to an acid selected from the group consisting of carbonic acid, phosphoric acid, lactic acid, citric acid, boric acid, sulfuric acid, and mixtures thereof in the presence of water. The crosslinked nanoparticles are thus encapsulated in a shell comprising a complex comprising the chromonic material, the multivalent cations, and the acid anions.

As used herein, "nanoparticles" refers to particles of less than about 1,000 nanometers.

As used herein, "chromonic materials" (or "chromonic compounds") refers to large, multi-ring molecules typically characterized by the presence of a hydrophobic core surrounded by various hydrophilic groups (see, for example, Attwood, T. K., and Lydon, J. E., Molec. Crystals Liq. Crystals, 108, 349 (1984)). The hydrophobic core can contain aromatic and/or non-aromatic rings. When in solution, these chromonic materials tend to aggregate into a nematic ordering characterized by a long-range order.

As used herein, "dispersion" means solid chromonic nanoparticles distributed or suspended within a liquid continuous phase that does not separate over a useful time period, for example, minutes, hours, or days.

In another aspect, the present invention provides a method of making encapsulated chromonic macro-sized particles. The method comprises (a) preparing an aqueous mixture comprising a chromonic material; (b) exposing the aqueous mixture comprising a chromonic material to a multivalent cation salt, to form crosslinked chromonic particles; and (c) exposing the resulting crosslinked chromonic particles to an acid selected from the group consisting of carbonic acid, phosphoric acid, lactic acid, citric acid, boric acid, sulfuric acid, and mixtures thereof in the presence of water. The crosslinked chromonic particles are thus encapsulated in a shell comprising the chromonic material, the multivalent cations, and the acid anions.

In yet another aspect, this invention provides chromonic particles encapsulated in a shell comprising a complex comprising chromonic material, multivalent cations, and acid anions selected from the group consisting of $HCO_3^-$, $PO_4^{3-}$, $CH_3CHOHCOO^-$, $C_3H_5O(COO)_3^{3-}$, $BO_3^{3-}$, and $SO_4^{2-}$.

The encapsulated particles of the invention are useful in many applications. They can be particularly useful for the encapsulation and controlled release of guest compounds (for example, drugs). For example, a drug can be encapsulated in a chromonic nanoparticle. The chromonics can protect the drug from certain environmental conditions and then controllably deliver the drug under other environmental conditions. The shell comprising a complex comprising chromonic material, multivalent cations, and acid anions selected from the group consisting of $HCO_3^-$, $PO_4^{3-}$, $CH_3CHOHCOO^-$, $C_3H_5O(COO)_3^{3-}$, $BO_3^{3-}$, and $SO_4^{2-}$ (the "complexed shell"), however, can provide increased protection from certain environmental conditions as compared to chromonics alone.

Multilayered chromonic structures comprising a chromonic nanoparticle encapsulated in one or more shell layers of chromonic material are known in the art (see, for example, U.S. patent application Ser. No. 11/275,202, filed Dec. 19, 2005). A drug can be encapsulated in the chromonic nanoparticle and/or in one or more chromonic shell layers that encapsulate the nanoparticle. The complexed shell provided by the present can be used in combination with one or more chromonic shell layers (for example, the complexed shell could be the innermost shell layer, an intermediate shell layer, the outermost shell layer, or any combination thereof). The complexed shell layers provided by the present invention therefore provide increased flexibility for the controlled release of drugs.

For example, when a combination of immediate and sustained release of a drug is desired (for example, in instances where a dosage provides an initial burst of release to rapidly alleviate a particular condition, followed by a sustained delivery to provide extended treatment of the condition, an outer chromonic shell layer can be formulated to provide a quick release and an inner complexed shell layer to provide a sustained delivery.

The complexed shell layer can also provide increased protection from environmental conditions in comparison to the protection provided by encapsulation in a chromonic nanoparticle and encapsulation in a chromonic shell layer. For example, the complexed shell layer can remain stable in acidic conditions longer than a chromonic shell layer.

DETAILED DESCRIPTION

Any chromonic material can be useful in the methods and structures of the invention. Compounds that form chromonic phases are known in the art, and include, for example, xanthoses (for example, azo dyes and cyanine dyes) and perylenes (see, for example, Kawasaki et al., Langmuir 16, 5409 (2000), or Lydon, J., Colloid and Interface Science, 8, 480 (2004). Representative examples of useful chromonic materials include di- and mono-palladium organyls, sulfamoyl-substituted copper phthalocyanines, and hexaaryltryphenylene.

Preferred chromonic materials include those selected from one or more of the following general formulae:

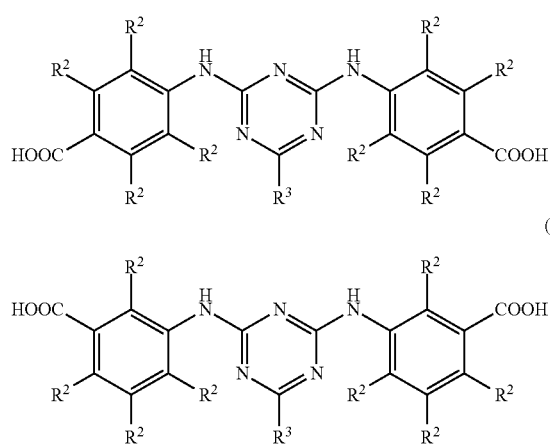

wherein
each $R^2$ is independently selected from the group consisting of electron donating groups, electron withdrawing groups, and electron neutral groups, and
$R^3$ is selected from the group consisting of a substituted and unsubstituted heteroaromatic ring, and a substituted and unsubstituted heterocyclic ring, the ring being linked to the triazine group through a nitrogen atom within the ring of $R^3$.

As depicted above, the chromonic compound is neutral, but it can exist in alternative forms such as a zwitterion or proton tautomer (for example, where a hydrogen atom is dissociated from one of the carboxyl groups and is associated with one of the nitrogen atoms in the triazine ring). The chromonic compound can also be a salt such as, for example, a carboxylate salt.

The general structures above show orientations in which the carboxyl group is para with respect to the amino linkage to the triazine backbone of the compound (formula I) and in which the carboxyl group is meta with respect to the amino linkage to the triazine backbone (formula II). The carboxyl group can also be a combination of para and meta orientations (not shown). Preferably, the orientation is para.

Preferably, each $R^2$ is hydrogen or a substituted or unsubstituted alkyl group. More preferably, $R^2$ is independently selected from the group consisting of hydrogen, unsubstituted alkyl groups, alkyl groups substituted with a hydroxy or halide functional group, and alkyl groups comprising an ether, ester, or sulfonyl. Most preferably, $R^2$ is hydrogen.

$R^3$ can be, but is not limited to, a heteroaromatic ring derived from pyridine, pyridazine, pyrimidine, pyrazine, imidazole, oxazole, isoxazole triazole, oxadiazole, thiadiazole, pyrazole, triazole, triazine, quinoline, and isoquinoline. Preferably, $R^3$ comprises a heteroaromatic ring derived from pyridine or imidazole. A substituent for the heteroaromatic ring $R^3$ can be selected from, but is not limited to, the group consisting of substituted and unsubstituted alkyl, carboxy, amino, alkoxy, thio, cyano, amide, sulfonyl, hydroxy, halide, perfluoroalkyl, aryl, ether, and ester groups. Preferably, the substituent for $R^3$ is selected from the group consisting of alkyl, sulfonyl, carboxy, halide, perfluoroalkyl, aryl, ether, and alkyl substituted with hydroxy, sulfonyl, carboxy, halide, perfluoroalkyl, aryl, or ether. When $R^3$ is a substituted pyridine, the substituent is preferably located at the 4-position. When $R^3$ is a substituted imidazole, the substituent is preferably located at the 3-position.

Representative examples of $R^3$ include 4-(dimethylamino)pyridinium-1-yl, 3-methylimidazolium-1-yl, 4-(pyrrolidin-1-yl)pyridinium-1-yl, 4-isopropylpyridinium-1-yl, 4-[(2-hydroxyethyl)methylamino]pyridinium-1-yl, 4-(3-hydroxypropyl)pyridinium-1-yl, 4-methylpyridinium-1-yl, quinolinium-1-yl, 4-tert-butylpyridinium-1-yl, and 4-(2-sulfoethyl)pyridinium-1-yl, shown below.

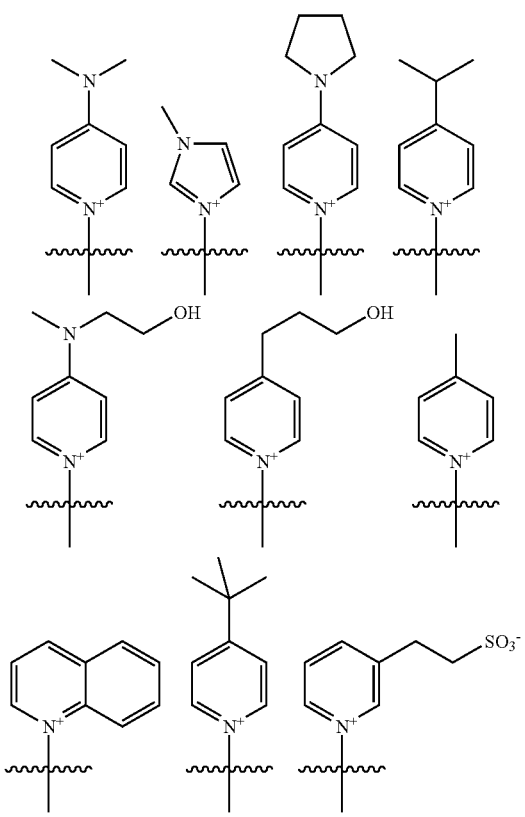

$R^3$ can also be represented by the following general structure:

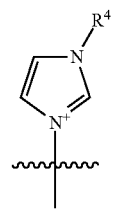

wherein $R^4$ is hydrogen or a substituted or unsubstituted alkyl group. More preferably, $R^4$ is selected from the group consisting of hydrogen, unsubstituted alkyl groups, and alkyl groups substituted with a hydroxy, ether, ester, sulfonate, or halide functional group. Most preferably $R^4$ is selected from the group consisting of propyl sulfonic acid, methyl, and oleyl.

$R^3$ can also be selected from heterocyclic rings such as, for example, morpholine, pyrrolidine, piperidine, and piperazine.

A preferred chromonic compound for use in the methods of the invention can be represented by one of the following formulae:

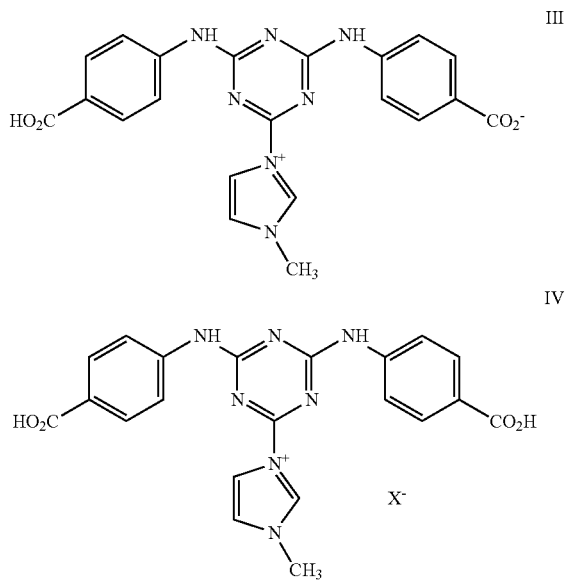

wherein $X^-$ is a counterion. Preferably, $X^-$ is selected from the group consisting of $HSO_4^-$, $Cl^-$, $CH_3COO^-$, and $CF_3COO^-$.

Formula III depicts the compound in its zwitterionic form. The imidazole nitrogen therefore carries a positive charge and one of the carboxy functional groups carries a negative charge ($COO^-$).

The compound can also exist in other tautomeric forms such as where both carboxy functional groups carry a negative charge and where positive charges are carried by one of the nitrogens in the triazine groups and the nitrogen on the imidazole group.

As described in U.S. Pat. No. 5,948,487 (Sahouani et al.), which is herein incorporated by reference in its entirety, triazine derivatives with formula I can be prepared as aqueous solutions. A typical synthetic route for the triazine molecules shown in formula I above involves a two-step process. Cyanuric chloride is treated with 4-aminobenzoic acid to give 4-{[4-(4-carboxyanilino)-6-chloro-1,3,5-triazin-2-yl]amino}benzoic acid. This intermediate is treated with a substituted or unsubstituted nitrogen-containing heterocycle. The nitrogen atom of the heterocycle displaces the chlorine atom on the triazine to form the corresponding chloride salt. The zwitterionic derivative, such as that shown in formula III above, is prepared by dissolving the chloride salt in ammonium hydroxide and passing it down an anion exchange column to replace the chloride with hydroxide, followed by solvent removal. Alternative structures, such as that shown in formula II above, may be obtained by using 3-aminobenzoic acid instead of 4-aminobenzoic acid.

Chromonic materials are capable of forming a chromonic phase or assembly when dissolved in an aqueous solution (preferably, an alkaline aqueous solution). Chromonic phases or assemblies are well known in the art (see, for example, Handbook of Liquid Crystals, Volume 2B, Chapter XVIII, Chromonics, John Lydon, pp. 981-1007, 1998) and consist of stacks of flat, multi-ring aromatic molecules. The molecules consist of a hydrophobic core surrounded by hydrophilic groups. The stacking can take on a number of morphologies, but is typically characterized by a tendency to form columns created by a stack of layers. Ordered stacks of molecules are formed that grow with increasing concentration.

Preferably, the chromonic material is placed in aqueous solution in the presence of one or more pH-adjusting compounds and optionally a surfactant. The addition of pH-adjusting compounds allows the chromonic material to become more soluble in aqueous solution. Suitable pH-adjusting compounds include any known base such as, for example, ammonium hydroxide or various amines. Surfactant can be added to the aqueous solution, for example, to promote incorporation of a drug into the chromonic matrix of the chromonic nanoparticle. As used herein, "chromonic matrix" refers to chromonic materials that are aggregated into a nematic ordering.

Suitable surfactants include ionic and non-ionic surfactants (preferably, non-ionic). Optional additives such as viscosity modifiers (for example, polyethylene glycol) and/or binders (for example, low molecular weight hydrolyzed starches) can also be added.

Typically, the chromonic materials are dissolved in the aqueous solution at a temperature less than about 40° C. (more typically, at room temperature), and neutralized to pH 6-8 by the addition of a base. The neutralized chromonic material may then be combined with a solution of water-soluble polymer. One skilled in the art will recognize, however, that the geometry and size of the resulting nanoparticles can be controlled to some extent by varying the temperature.

The aqueous composition comprising a chromonic material can be mixed with a continuous phase comprising a water-soluble polymer to form the aqueous mixture.

Preferably, the water-soluble polymer has a molecular weight of less than about 20,000. Useful water-soluble polymers include, for example, vinyl alcohol polymers, aspartic acid polymers, acrylic acid polymers, methacrylic acid polymers, acrylamide polymers, vinyl pyrrolidone polymers, poly(alkylene oxide)s, vinyl methyl ether polymers, sulfonated polyesters, complex carbohydrates, guar gum, gum arabic, gum tragacanth, larch gum, gum karaya, locust bean gum, agar, alginates, caragheenan, pectins, cellulose and cellulose derivatives, starches and modified starches, and combinations thereof. Copolymers, for example, block or random copolymers can also be useful. Preferred water-soluble polymers include, for example, cellulosics, starches (including modified starches such as phosphonated or sulfonated starches) polyvinyl alcohol, polyethylene glycol, polypropylene glycol, polyethylene glycol)-co-(propylene glycol), and mixtures thereof.

The particular water-soluble polymer may influence the shape of the nanoparticles. In most instances, spherical nanoparticles are obtained. In another embodiment, acicular (needle-like) metallic nanoparticles have resulted from the use of modified starch. The aspect ratios of the nanoparticles typically range from 1:4 to 1:10, and have primary dimensions from about 300 nanometers to about 10 microns. In yet another embodiment, oblate spheroidal or toroidal shapes may be obtained.

The relative concentrations of each of the components in the aqueous mixture will vary with the desired size of the resulting nanoparticles and their intended application. Generally, however, the chromonic material will be added to the solution of water-soluble polymer in amounts sufficient such that the chromonic phase is discontinuous and the water-soluble polymer phase is continuous. The amounts of water-soluble polymer and chromonic material are generally selected so that the ratio is at least about 5:1 and less than about 99:1, and preferably 3:1 to 15:1, on a dry weight basis. Generally, the water-soluble polymer comprises from about 15 to about 25 weight percent of the aqueous mixture. Generally, the concentration of chromonic material is from about 0.25 to about 7 weight percent of the aqueous mixture.

Optionally, surfactants and other additives (for example, short chain alcohols such as ethanol) that increase surface tension or promote coating can be added.

The chromonic nanoparticles formed from the aqueous mixture are non-covalently crosslinked by multivalent cations. This crosslinking makes the nanoparticles insoluble in water. By non-covalent, it is meant that the crosslinking does not involve permanently formed covalent (or chemical) bonds. That is, the crosslinking does not result from a chemical reaction that leads to a new, larger molecule, but rather results from electrostatic and/or coordination associations of the cations with the host molecules that are strong enough to hold them together without undergoing a chemical reaction. These interactions are typically ionic in nature and can result from interaction of a formal negative charge on the host molecule with the formal positive charge of a multivalent cation. Since the multivalent cation has at least two positive charges, it is able to form an ionic bond with two or more chromonic molecules, that is, a crosslink between two or more chromonic molecules. Divalent and/or trivalent cations are preferred. It is more preferred that a majority of the multivalent cations are divalent. Suitable cations include any divalent or trivalent cations, with barium, calcium, magnesium, zinc, aluminum, and iron being particularly preferred.

Generally, the chromic material is crosslinked after formation of the dispersion comprising a continuous phase of water-soluble polymer and discontinuous phase of chromonic material. Typically, the dispersion is added to a solution of excess polyvalent cation salt.

Subsequent to non-covalent crosslinking, the nanoparticle surface can be modified with a surface-modifying agent to render the particles more hydrophilic, hydrophobic, biocompatible, or bioactive. The surface groups are present on the surface of the particle in an amount sufficient to provide surface-modified chromonic nanoparticles that are capable of being subsequently dispersed in a continuous phase without aggregation. The surface groups preferably are present in an amount sufficient to form a monolayer, preferably a continuous monolayer, on the surface of the chromonic nanoparticle. Generally, the crosslinked chromonic nanoparticle is first isolated from the water-soluble polymer dispersion, then resuspended in a solution of surface modifying agent.

Surface modifying groups may be derived from surface modifying agents. Schematically, surface modifying agents can be represented by the formula A-B, where the A group is capable of attaching to the surface of the chromonic nanoparticle and the B group is a compatibilizing group that confers the desired hydrophilicity, hydrophobicity or biocompatibility. Compatibilizing groups can be selected to render the particle relatively more polar, relatively less polar or relatively non-polar.

Suitable classes of surface-modifying agents include organic oxyacids of carbon, sulfur and phosphorus, for example, alkylcarboxylates, alkyl sulfates, alkylsulfonates, alkyl phosphates and alkylphosphonates, glycoside phosphonates, and combinations thereof. The surface-modifying agents available under the trade names Tweens™ and Spans™ can also be useful.

Representative examples of polar surface-modifying agents having carboxylic acid functionality include poly(ethylene glycol) monocarboxylic acid having the chemical structure $CH_3O(CH_2CH_2O)_nCH_2COOH$ (n=2-50) and 2-(2-methoxyethoxy)acetic acid having the chemical structure $CH_3OCH_2CH_2OCH_2COOH$ in either acid or salt forms.

Representative examples of non-polar surface-modifying agents having carboxylic acid functionality include octanoic acid, dodecanoic acid and oleic acid in either acid or salt form. In the case of a carboxylic acid containing olefinic unsaturation, such as oleic acid, the carbon-carbon double bonds may be present as either the Z or E stereoisomers or as a mixture thereof.

Examples of suitable phosphorus containing acids include alkylphosphonic acids including, for example, octylphosphonic acid, decylphosphonic acid, dodecylphosphonic acid, octadecylphosphonic acid, oleylphosphonic acid and poly(ethylene glycol) monophosphonic acid having the chemical structure $CH_3O(CH_2CH_2O)_nCH_2CH_2PO_3H_2$ (n=2-50) in either acid or salt forms. In the case of a phosphonic acid containing olefinic unsaturation, such as oleylphosphonic acid, the carbon-carbon double bonds may be present as either the Z or E stereoisomers or as a mixture thereof.

Additional examples of suitable phosphorus containing acids include alkyl phosphates such as mono- and diesters of phosphoric acid including, for example, octyl phosphate, dodecyl phosphate, oleyl phosphate, dioleyl phosphate, oleyl methyl phosphate and poly(ethylene glycol) monophosphoric acid having the chemical structure $CH_3O(CH_2CH_2O)_nCH_2CH_2OPO_3H_2$ (n=2-50).

In some modifications, the B group of the surface modifying agent A-B can also contain an additional specific functional group(s) to further adjust the hydrophilicity, hydrophobicity or biocompatibility of the chromonic nanoparticle. Suitable functional groups include, but are not limited to the hydroxyl, carbonyl, ester, amide, ether, amino, and quaternary ammonium functions.

Other suitable surface modifying agents are surfactants of polymeric nature.

If biocompatibility is desired, the chromonic nanoparticles may be surface modified with glycosides phosphonates, for example, glucosides, mannosides, and galactosides of phosphonic acid.

In some embodiments, the aqueous composition can be mixed with a noble metal salt in solution to produce metallic chromonic nanoparticles. Subsequently, the mixture can be brought into contact with a polyvalent cation salt to non-covalently crosslink the chromonic material and incorporate the noble metal salt.

Preferred noble metal salts include silver salts (for example, silver nitrate, silver acetate, and the like), gold salts (for example, gold sodium thiomalate, gold chloride, and the like), platinum salts (for example, platinum nitrate, platinum chloride, and the like), and mixtures thereof. Other transition metals can also be used. In particular, salts of monovalent transition metal cations can be used.

The metal salt can be reduced to produce a suspension of elemental noble metal nanoparticles contained in the crosslinked chromonic nanoparticle. This can be accomplished via reduction methods known in the art. For example, the reduction can be accomplished by using a reducing agent (for example, tris(dimethylamino)borane, sodium borohydride, potassium borohydride, or ammonium borohydride), electron beam (e-beam) processing, or ultraviolet (UV) light.

The metal nanoparticles can, for example, serve as a tag. They can be useful in numerous applications such as medical imaging, optical switching devices, optical communication systems, infrared detectors, infrared cloaking devices, chemical sensors, passive solar radiation collection or deflecting devices and the like.

Crosslinked chromonic nanoparticles formed from the aqueous mixture can be exposed to an acid in the presence of water to encapsulate the crosslinked nanoparticles in a shell comprising a complex comprising chromonic material, multivalent cations (from the multivalent cation salt), and acid anions. Suitable acids include carbonic acid, phosphoric acid, lactic acid, citric acid, boric acid, sulfuric acid, and mixtures thereof. Preferred acids are carbonic acid and phosphoric acid.

The acid is present in an amount such that the crosslinked chromonic nanoparticles do not substantially dissolve (for example, in amount such that no more than about 25 weight percent (preferably, no more than about 10 weight percent) of the chromonic nanoparticles dissolve in a 2 hour period. When the acid is phosphoric acid, for example, the weight ratio of 1N phosphoric acid:water is typically between about 1:10 and about 1:300 (preferably, between about 1:25 and about 1:100; more preferably, about 1:50).

The crosslinked chromonic nanoparticles can be exposed to the acid in the presence of water in numerous ways. For example, acid can be added to an aqueous solution comprising the crosslinked chromonic nanoparticles, or crosslinked chromonic nanoparticles could be mixed with a dilute acid solution. When the acid to be utilized is carbonic acid, a vessel containing an aqueous solution comprising the crosslinked chromonic nanoparticles can be placed in a sealed container with dry ice, or dry ice can be bubbled through the aqueous solution comprising the crosslinked chromonic nanoparticles.

Optionally, the chromonic nanoparticles can be also have chromonic shell layers in addition to the complexed shell. For example, an interior chromonic shell layer (that is, a chromonic shell layer located in between the chromonic nanoparticle and the complexed shell) can be added by dispersing the crosslinked chromonic nanoparticles in a composition comprising a chromonic material, and then preparing a second aqueous mixture comprising the dispersion and a continuous water-soluble polymer phase, before forming the complexed shell. Alternatively, or in addition to interior chromonic shell layers, an exterior chromonic shell layer can be added by dispersing chromonic nanoparticles encapsulated in a complexed shell in a composition comprising a chromonic material, and then preparing a second aqueous mixture comprising the dispersion and a continuous water-soluble polymer phase.

Any of the chromonic materials described above can be used in the composition comprising a chromonic material. The chromonic material used in the composition comprising a chromonic material can be the same chromonic material or a different chromonic material than that utilized in the first aqueous mixture. For example, in some applications it can be advantageous to use two different chromonic materials that have different absorbencies or different stabilities in low pH conditions.

Any of the water-soluble polymers described above can be used for the continuous water-soluble polymer phase of the second aqueous mixture. The water-soluble polymer used in the second aqueous mixture can be the same water-soluble polymer or a different water-soluble polymer than that utilized in the first aqueous mixture.

The second aqueous mixture can be made using essentially the same procedure as described for making the first aqueous mixture, except that concentrations of the components will vary.

For the second aqueous mixture, the chromonic material can be dissolved in an aqueous solution. Generally, the chromonic material will be added to the solution to achieve a concentration in the range of about 0.1 to about 30 (preferably, about 2 to about 20) percent by weight of the solution. Crosslinked chromonic nanoparticles can be dispersed in this aqueous solution comprising a chromonic material. This dispersion can then be mixed with the second continuous water-soluble polymer phase to make the second aqueous mixture. Typically, the amount of water-soluble polymer and chromonic material are selected so that the ratio is at least about 1:1 and less than about 10:1 on a dry weight basis.

Optionally, pH-adjusting compounds, surfactants, and/or noble metal salts can be utilized as described above.

The chromonic nanoparticles will be encapsulated in the chromonic material of the second discontinuous chromonic phase. The thickness of this "shell" or layer of chromonic material around the chromonic nanoparticle will typically be about from about a few molecules thick (for example, a monolayer) to about 200 nanometers.

The chromonic shell layer can be non-covalently crosslinked by multivalent cations. Generally, the chromonic material is crosslinked after formation of the second aqueous dispersion. Typically, the dispersion is added to a solution of excess polyvalent cation salt.

Subsequent to non-covalent crosslinking, the second discontinuous chromonic phase can be contacted with a surface-modifying agent, as described above, to render the shell layer of chromonic material around the chromonic nanoparticle more hydrophilic, hydrophobic, biocompatible, or bioactive.

If one or more additional shell layers of chromonic material are desired, the above-described procedure can be repeated.

The present invention can also be used to make encapsulated chromonic macro-size particles. Chromonic material, as described above, can be placed in aqueous solution in the presence of one or more pH-adjusting compounds and optionally surfactant.

The resulting aqueous mixture comprising a chromonic material can be exposed to multivalent cation salt to form non-covalently crosslinked chromonic particles. Particles can be made in nearly any desired shape. If, for example, spherical particles are desired the aqueous mixture comprising a chromonic material can be added drop wise to a solution comprising the multivalent cation salt. Other shaped particles can be formed, for example, by molding a paste-like aqueous mixture comprising chromonic material into a desired shape.

The resulting crosslinked chromonic particles can then be exposed to an acid selected from the group consisting of carbonic acid, phosphoric acid, lactic acid, citric acid, boric acid, sulfuric acid, and mixtures thereof in the presence of water, as described above, to encapsulate the crosslinked particles in a complexed shell.

The present invention provides chromonic particles (nano- or macro-sized) encapsulated in a shell comprising a complex of chromonic material, multivalent cations, and acid anions selected from the group consisting of $HCO_3^-$, $PO_4^{3-}$, $CH_3CHOHCOO^-$, $C_3H_5O(COO)_3^{3-}$, $BO_3^{3-}$, $SO_4^{2-}$, and mixtures thereof. The complexed shell can be useful, for example, in sorption applications (for example, to absorb certain proteins, cations, small molecule drugs or catalysts). The present invention can also be used for the controlled release of one or more guest compounds. Guest compounds can be encapsulated within the chromonic (nano)particles and/or within any optional chromonic shell layers.

For example, the complexed shell can effectively isolate guest molecules that are unstable in the presence of an acid. Thus, they will not degrade while encapsulated within the complexed shell.

Examples of useful guest compounds include dyes, cosmetic agents, fragrances, flavoring agents, and bioactive compounds, such as drugs, herbicides, pesticides, pheromones, and antimicrobial agents (for example, antibacterial agents, antifungal agents, and the like). A bioactive compound is herein defined as a compound intended for use in the diagnosis, cure, mitigation, treatment or prevention of disease, or to affect the structure or function of a living organism. Drugs (that is, pharmaceutically active ingredients) that are intended to have a therapeutic effect on an organism are particularly useful guest compounds. Alternatively, herbicides and pesticides are examples of bioactive compounds intended to have a negative effect on a living organism, such as a plant or pest. Although any type of drug can be employed in the present invention, particularly suitable drugs include those that are relatively unstable when formulated as solid dosage forms, those that are adversely affected by the low pH conditions of the stomach, those that are adversely affected by exposure to enzymes in the gastrointestinal tract, and those that are desirable to provide to a patient via sustained or controlled release.

The complexed shell and the chromonic (nano)particle will selectively protect a drug from certain environmental conditions and then controllably deliver the drug under other environmental conditions. For example, the complexed shell can be stable in the acidic environment of the stomach and will dissolve when passed into the non-acidic environment of the intestine when administered to an animal as a result of the change in pH. Chromonic materials can also protect a drug from enzymatic degradation.

Guest compounds can be contained or intercalated in chromonic nanoparticles by adding guest compounds to the first aqueous solution of chromonic material. Alternatively, a guest compound can be dispersed or dissolved in another excipient or vehicle, such as an oil or propellant, prior to mixing with the chromonic materials or multivalent cation solutions. (Nano)particles can be collected by, for example, filtration, spraying, or other means, and dried to remove the aqueous carrier.

A guest compound, such as a drug, can be dissolved in an aqueous dispersant-containing solution prior to introduction of the chromonic material. Suitable dispersants include alkyl phosphates, phosphonates, sulfonates, sulfates, or carboxylates, including long chain saturated fatty acids or alcohols and mono or poly-unsaturated fatty acids or alcohols. Oleyl phosphonic acid is an example of a suitable dispersant. Although not to be bound by any particular theory, it is thought that the dispersant aids in dispersing the guest compound so that it may be better encapsulated.

An alkaline compound can be added to the guest compound solution prior to introduction of the chromonic material. Alternatively, an alkaline compound can be added to a chromonic material solution prior to mixing the guest compound and chromonic material solutions. Examples of suitable alkaline compounds include ethanolamine, sodium or lithium hydroxide, or amines such as mono, di, triamines or polyamines. Although not to be bound by theory, it is thought that alkaline compounds aid in dissolving the host compound, particularly where the host compound is a triazine compound such as those described in formulas I and II above.

Although large particles (for example, on the order of several millimeters in diameter) can be prepared, the mass median diameter of nanoparticles of the present invention is typically less than 1000 nanometers in size, usually less than 500 nanometers in size, and in some cases less than 100 nanometers in size. In certain instances it may be desired to have particles greater than 1 μm in size. In particular, these particle sizes may be desirable for oral delivery of drugs that are unstable in the intestine due to the presence of certain enzymes. Examples of such drugs include proteins, peptides, antibodies, and other biologic molecules that may be particularly sensitive to the body's enzymatic processes. In such cases, these small particles may be taken up into the intestinal wall directly, such that the particle primarily dissolves after passing the intestinal barrier, so that the amount of the sensitive drug exposed to the intestinal environment is minimized.

In some cases, however, larger particles can be desirable. For example, larger particle sizes may be desirable for topically administering drugs (for example, in a paste or ointment).

Guest compounds can be contained or intercalated in an optional chromonic shell layer by adding guest compounds to the second aqueous solution of chromonic material or, if the discontinuous chromonic phase is non-covalently crosslinked, the multivalent cation solution prior to precipitation. As described above, a guest compound can be dispersed or dissolved in another excipient or vehicle, such as an oil or propellant, prior to mixing with the chromonic materials or multivalent cation solutions.

Chromonic (nano)particles and chromonic shell layer(s) are dissolvable in an aqueous solution of univalent cations or other non-ionic compounds such as surfactants. Typical univalent cations include sodium and potassium. The concentration of univalent cations needed to dissolve the chromonic (nano)particles and chromonic shell layer(s) will depend on the type and amount of the chromonic molecules within the nanoparticles and shell layer(s). Therefore, different chromonic materials can be chosen for the nanoparticles and optional chromonic shell layer(s) so that they dissolve at different concentrations. Generally, however, for complete dissolution there should be at least a molar amount of univalent cations equivalent to the molar amount of carboxyl groups in the matrix. In this way, there will be at least one univalent cation to associate with each carboxyl group.

The complexed shells of the present invention, however, exhibit increased resistance to aqueous solutions of univalent cations and other non-ionic compounds as compared to chromonic (nano)particles and chromonic shell layers.

The present invention is particularly useful for encapsulating drugs for use in oral dosage delivery. Typical oral dosage forms include solid dosages, such as tablets and capsules, but can also include other dosages administered orally, such as liquid suspensions and syrups. The complexed shell of the invention can be stable in the acidic environment of the stomach for periods of time longer than 1 hour, sometimes longer than 12 hours, and may even be stable for more than 100 hours.

EXAMPLES

Objects and advantages of this invention are further illustrated by the following examples, but the particular materials and amounts thereof recited in these examples, as well as other conditions and details, should not be construed to unduly limit this invention.

Unless otherwise noted, all reagents and compounds were or can be obtained from Sigma-Aldrich Chemical Co., St. Louis, Mo. As used herein, "purified water" refers to water available under the trade designation "OMNISOLVE" from EMD Chemicals, Inc., Gibbstown, N.J.

The optical microscope used was microscope Model UCT with FC6 cyro attachment available from Leica Microsystems, Inc., Bannockburn, Ill.) and measurements using dynamic light scattering techniques were made on a Malvern Zen 3600 from Malvern Company, Worcestershire, UK.

Preparation of the Chromonic Mixture ("Chromonic Mixture")

A mixture containing the chromonic compound of Formula IV (30% by weight) in purified water was magnetically stirred in a flask for approximately 45 minutes to make a white paste. A freshly prepared solution of Sodium hydroxide (50% by weight in purified water) was added drop wise to the flask containing the white paste until its appearance changed to a creamy liquid crystalline solution. The pH of this mixture was maintained to be at or less than 7.5 during this addition process by controlling the addition of sodium hydroxide solution. The resulting creamy liquid crystalline solution was used as needed.

Preparation of Chromonic Mixture-HPMC Emulsion ("Chromonic-HPMC")

A portion of the chromonic mixture was dispersed in a solution containing hydroxypropyl methylcellulose (HPMC, 25% in purified water; chromonic mixture to HMPC solution ratio 1:20 by weight) by stirring for 30 minutes at room temperature.

This emulsion (0.6 g) was then added to an aqueous solution (10 ml) containing calcium chloride and zinc chloride (5% each, by weight). This solution was shaken for 30 minutes at room temperature and centrifuged at 3500 rpm for 20 minutes. The resulting supernatant was then discarded. The remaining residue was washed with purified water (10 ml) and was centrifuged again at 3500 rpm for 20 minutes. A sample of the resulting residue fluoresced blue when viewed under an optical microscope and measurements using dynamic light scattering techniques indicated it to contain particles in the range of 500 nm.

Preparation of Phosphate Buffer Saline Solution (PBS)

This solution was made by mixing stock solution A (200 ml) with stock solution B (60 ml) for 15 min using a magnetic stirrer and adjusting pH to 7.5 using stock solution B as needed. Stock solution A contained disodium hydrogen phosphate (1 g) and sodium chloride (1.7 g) in purified water (200 ml). Stock solution B contained disodium hydrogen phosphate (0.56 g) and sodium chloride (1.7 g) in purified water (200 ml).

Examples 1 and 2

A portion of the chromonic-HPMC (1.0 g) was added to a solution of calcium chloride (10%) in purified water and kept undisturbed for 10 minutes and then shaken using a shaker bed (Gyrotory Shaker—Model G2, New Brunswick Scientific Co., Inc., Edison, N.J., USA) for an additional 30 minutes at room temperature. Then this mixture in an open container was kept inside a sealed jar containing dry ice for 6 hours. After this period, the sample was centrifuged at 3500 rpm for 20 minutes. The resulting supernatant was then discarded. The remaining residue was washed with purified water (10 ml) and was centrifuged again at 3500 rpm for 20 minutes. A sample of the resulting residue fluoresced blue when viewed under an optical microscope and measurements using dynamic light scattering techniques indicated it to contain particles in the range of 500 nm.

Samples of the resulting residue (1.0 g) were tested by adding to PBS (5 ml) and stirring at room temperature for a period of time as reported in Table 1. After the designated time period, the samples were centrifuged at 3500 rpm for 20 minutes. The resulting supernatant was then discarded. Weight of the remaining residue was compared to the initial weight of the same sample to calculate the remaining amount, which is reported in Table 1 as percent remaining.

Comparative Examples 1 and 2

Samples were prepared and analyzed using the same procedure as described for Examples 1 and 2 except for after shaking the sample for 30 min, it was kept undisturbed for 4 hours and not placed in the presence of dry ice. Results obtained are also included in Table 1.

TABLE 1

| Example | Description | Time (hours) | Percent remaining |
|---------|-------------|--------------|-------------------|
| C1 | No dry ice | 24 | 52 |
| 1 | With Dry Ice | 24 | 74 |
| C2 | No dry ice | 48 | 30 |
| 2 | With Dry Ice | 48 | 45 |

Comparative Example 3

A portion of the chromonic mixture (1.0 g) was added drop wise from a 2 ml pipette to a 10% solution of calcium chloride (10 ml) in purified water over a 5 minute period to form large beads of about 5 mm in diameter. This mixture was then was stored as is for 12 hours at room temperature. The supernatant was discarded and the remaining residue was washed with purified water (10 ml). PBS (10 ml) was added to the residue and the mixture was shaken gently at room temperature for a period of time as reported in Table 2. The time it took to completely dissolve the residue (defined as the time at which the residue can no longer be seen) is listed in Table 2.

Example 3

A portion of the chromonic mixture (1.0 g) was added drop wise from a 2 ml pipette to a 10% solution of calcium chloride (10 ml) in purified water over a 5 minute period to form large beads of about 5 mm in diameter. This mixture was kept in an open container inside a sealed jar containing dry ice for 2 hours after the sample thawed from initial freezing when it was placed in the sealed container. The supernatant was discarded and the remaining residue was washed with purified water (10 ml). PBS (10 ml) was added to the residue and the mixture was shaken gently at room temperature for a period of time as reported in Table 2. The time it took to completely dissolve the residue (defined as the time at which the residue can no longer be seen) is listed in Table 2.

Example 4

A portion of the chromonic mixture (1.0 g) was added drop wise from a 2 ml pipette to a 10% solution of calcium chloride (10 ml) in purified water over a 5 minute period to form large beads of about 5 mm in diameter. This mixture was kept in an open container inside a sealed jar containing dry ice for 12 hours after the sample thawed from initial freezing when it was placed in the sealed container. The supernatant was discarded and the remaining residue was washed with purified water (10 ml). PBS (10 ml) was added to the residue and the mixture was shaken gently at room temperature for a period of time as reported in Table 2. The time it took to completely dissolve the residue (defined as the time at which the residue can no longer be seen) is listed in Table 2.

Example 5

A portion of the chromonic mixture (1.0 g) was added drop wise from a 2 ml pipette to a 10% solution of calcium chloride (10 ml) in purified water over a 5 minute period to form large beads of about 5 mm in diameter. This mixture was kept for 5 minutes undisturbed. After this period, the supernatant was discarded. Purified water (10 ml) was added to the remaining beads, swirled gently for 20 seconds and the supernatant was discarded. Purified water (10 ml) containing phosphoric acid (0.1 g, 1N) was then added to the remaining residue and this mixture was kept undisturbed for 5 minutes. The supernatant was discarded and the remaining residue was washed with purified water (10 ml). PBS (10 ml) was added to the residue and the mixture was shaken gently at room temperature for a period of time as reported in Table 2. The time it took to completely dissolve the residue (defined as the time at which the residue can no longer be seen) is listed in Table 2.

Example 6

A portion of the chromonic mixture (1.0 g) was added drop wise from a 2 ml pipette to a 10% solution of calcium chloride (10 ml) in purified water over a 5 minute period to form large beads of about 5 mm in diameter. This mixture was kept for 5 minutes undisturbed. After this period, the supernatant was discarded. Purified water (10 ml) was added to the remaining beads, swirled gently for 20 seconds and the supernatant was discarded. Purified water (10 ml) containing phosphoric acid (0.1 g, 1N) was then added to the remaining residue and this mixture was kept undisturbed for 12 hours. The supernatant was discarded and the remaining residue was washed with purified water (10 ml). PBS (10 ml) was added to the residue and the mixture was shaken gently at room temperature for a period of time as reported in Table 2. The time it took to completely dissolve the residue (defined as the time at which the residue can no longer be seen) is listed in Table 2.

TABLE 2

| Example | Complex Agent | Reaction Time | Hours to Dissolution in PBS |
|---|---|---|---|
| C3 | None | 12 Hours | 1 |
| 3 | Carbon dioxide | 2 Hours | 2 |
| 4 | Carbon dioxide | 12 Hours | 8 |
| 5 | Phosphoric Acid | 5 Minutes | 18 |
| 6 | Phosphoric Acid | 12 Hours | More than 150 |

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. A method of making encapsulated chromonic particles comprising an encapsulated chromonic particle comprising: a chromonic particle encapsulated in a shell, said chromonic particle comprising multiple chromonic molecules, and said shell comprising a complex comprising chromonic material, multivalent cations, and acid anions selected from the group consisting of $HCO_3^-$, $PO_4^{3-}$, $CH_3CHOHCOO^-$, $C_3H_5O(COO)_3^{3-}$, $BO_3^{3-}$, $SO_4^{2-}$, and mixtures thereof, said method comprising:
   (a) preparing an aqueous mixture comprising a chromonic material;
   (b) exposing the aqueous mixture comprising a chromonic material to a multivalent cation salt, to form crosslinked chromonic particles; and
   (c) exposing the resulting crosslinked chromonic particles to an acid selected from the group consisting of carbonic acid, phosphoric acid, lactic acid, citric acid, boric acid, sulfuric acid, and mixtures thereof in the presence of water to encapsulate the crosslinked particles in a shell comprising a complex comprising the chromonic material, the multivalent cations, and the acid anions; wherein the acid is present in an amount that does not substantially dissolve the crosslinked chromonic particles.

2. The method of claim 1 wherein the acid is present in an amount such that no more than about 25 weight percent of the crosslinked chromonic particles dissolve in a 2 hour period.

3. The method of claim 1 wherein the acid is present in an amount such that no more than about 10 weight percent of the crosslinked chromonic particles dissolve in a 2 hour period.

4. The method of claim 1 wherein the aqueous mixture further comprises a guest compound.

5. The method of claim 1 wherein the encapsulated chromonic particles are encapsulated chromonic nanoparticles, the aqueous mixture further comprises (i) a continuous water-soluble polymer phase and (ii) a discontinuous chromonic phase comprising the chromonic material, the aqueous mixture is prepared so as to form chromonic nanoparticles, and said exposing the aqueous mixture further comprises non-covalently crosslinking the resulting chromonic nanoparticles with the multivalent cation salt.

6. The method of claim 5 wherein the weight ratio of 1N phosphoric acid:water is between about 1:10 and about 1:300.

7. The method of claim 1 wherein the resulting crosslinked chromonic nanoparticles are in an aqueous solution.

8. The method of claim 7 wherein the aqueous solution comprising the resulting crosslinked chromonic nanoparticles is exposed to carbon dioxide.

9. The method of claim 1 wherein the discontinuous chromonic phase further comprises a guest compound.

10. The method of claim 9 wherein the guest compound is a bioactive compound.

11. The method of claim 10 wherein the guest compound is a drug.

12. The method of claim 1 further comprising dispersing the resulting crosslinked chromonic nanoparticles in a composition comprising a chromonic material to form a chromonic nanoparticle dispersion; and preparing a second aqueous mixture comprising (i) a second discontinuous chromonic phase comprising the chromonic nanoparticle dispersion and (ii) a second continuous water-soluble polymer phase, to encapsulate the chromonic nanoparticles in a first shell before exposing the nanoparticles to an acid to encapsulate the nanoparticles in the shell comprising a complex.

13. The method of claim 12 wherein the second discontinuous chromonic phase further comprises a guest compound.

14. The method of claim 1 further comprising dispersing the resulting chromonic nanoparticles encapsulated in a shell comprising a complex in a composition comprising a chromonic material to form a chromonic nanoparticle dispersion and preparing a second aqueous mixture comprising (i) a second discontinuous chromonic phase comprising the chromonic nanoparticle dispersion and (ii) a second continuous water-soluble polymer phase.

15. The method of claim 14 wherein the second discontinuous chromonic phase further comprises a guest compound.

16. The method of claim 1 wherein the multivalent cation of the multivalent cation salt is selected from the group consisting of $Ba^{2+}$, $Ca^{2+}$, $Fe^{2+}$, $Fe^{3+}$, $Zn^{2+}$, $Mg^{2+}$, and $Al^{3+}$.

17. The method of claim 1 wherein the water-soluble polymer is selected from the group consisting of vinyl alcohol polymers, aspartic acid polymers, acrylic acid polymers, methacrylic acid polymers, acrylamide polymers, vinyl pyrrolidone polymers, poly(alkylene oxide)s, vinyl methyl ether polymers, sulfonated polyesters, complex carbohydrates, guar gum, gum arabic, gum tragacanth, larch gum, gum karaya, locust bean gum, agar, alginates, caragheenan, pectins, cellulose and cellulose derivatives, starches and modified starches, and combinations thereof.

18. The method of claim 1 wherein the chromonic material is selected from one or more of the following general formulae:

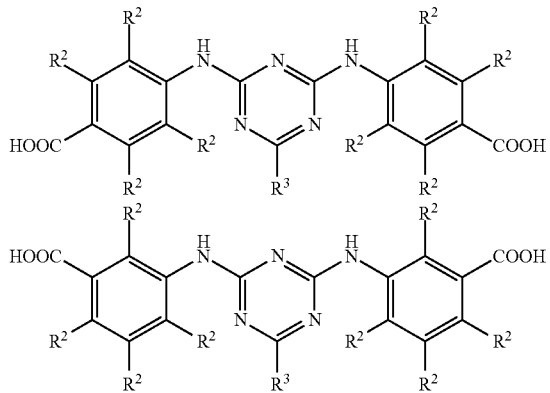

wherein each $R^2$ is independently selected from the group consisting of electron donating groups, electron withdrawing groups, and electron neutral groups, and $R^3$ is selected from the group consisting of substituted and unsubstituted heteroaromatic rings and substituted and unsubstituted heterocyclic rings, said rings being linked to the triazine group through a nitrogen atom within the ring of $R^3$, and zwitterions, proton tautomers, and salts thereof.

19. The method of claim 18 wherein the chromonic material is selected from one or more of the following general formulae:

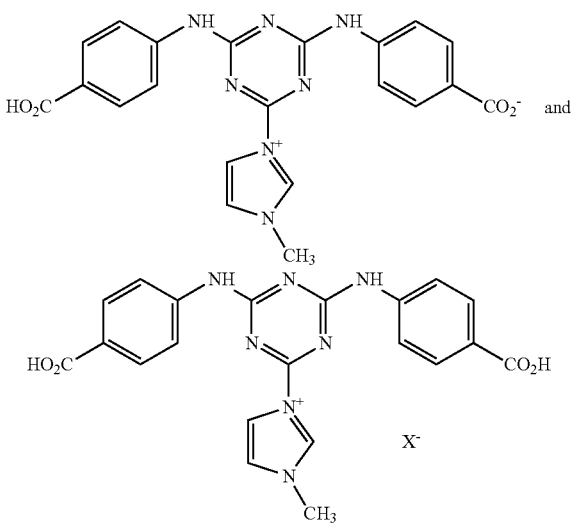

wherein X— is a counterion.

20. The method of claim 19 wherein the aqueous mixture further comprises a noble metal salt, and said method further comprises reducing the noble metal salt to produce a suspension of elemental noble metal nanoparticles contained in the crosslinked chromonic nanoparticles.

* * * * *

UNITED STATES PATENT AND TRADEMARK OFFICE
CERTIFICATE OF CORRECTION

PATENT NO.        : 7,981,469 B2
APPLICATION NO.   : 12/895013
DATED             : July 19, 2011
INVENTOR(S)       : Hassan Sahouani It is certified that error appears in the above-identified patent and that said Letters Patent is hereby corrected as shown below:

First Page, Column 1 Item 73 (Assignee)
Line 1, delete "Properites" and insert -- Properties --, therefor.

Column 1
Line 8 (Approx.), delete "2005" and insert -- 2005, --, therefor.

Column 2
Line 29 (Approx.), delete "$SO_4^{2}$" and insert -- $SO_4^{2-}$ --, therefor.

Column 3
Line 4-5 (Approx.), delete "hexaaryltryphenylene." and insert
-- hexaaryltriphenylene. --, therefor.

Line 60, delete "triazole," and insert -- thiazole, --, therefor.

Column 6
Line 44, delete "caragheenan," and insert -- carrageenan, --, therefor.

Column 12
Line 66, delete ""OMNISOLVE"" and insert -- "OMNISOLV" --, therefor.

Column 13
Line 23, delete "HMPC" and insert -- HPMC --, therefor.

Line 52, delete "(Gyrotory" and insert -- (Gyratory --, therefor.

Column 17
Line 19, In Claim 17, delete "caragheenan," and insert -- carrageenan, --, therefor.

Signed and Sealed this
Thirteenth Day of December, 2011

David J. Kappos
*Director of the United States Patent and Trademark Office*

Column 18

Line 36, In Claim 19, delete "X—" and insert -- X⁻ --, therefor.